Patented Sept. 30, 1941

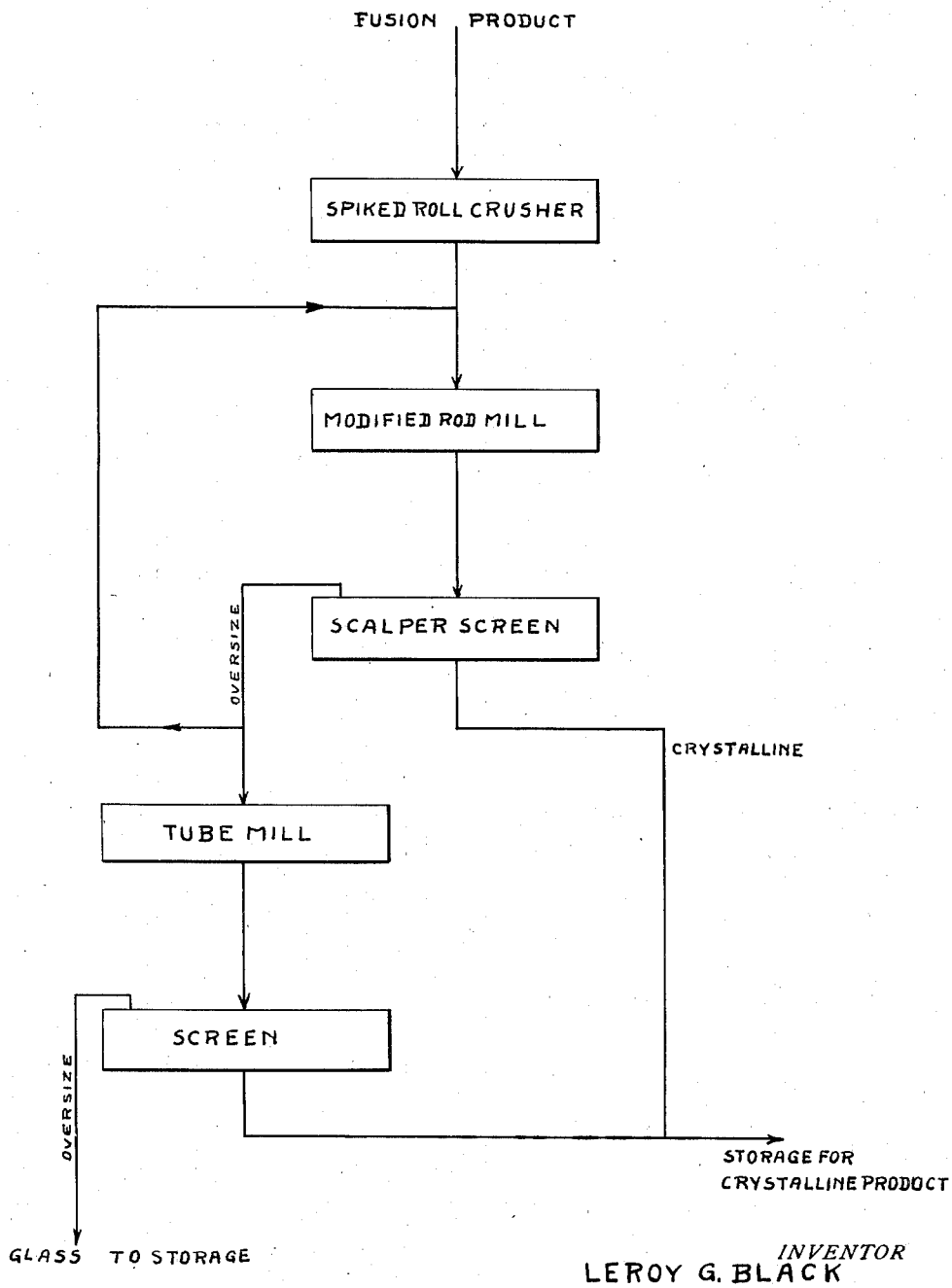

2,257,325

UNITED STATES PATENT OFFICE 2,257,325

METHOD OF SEPARATING FUSED PRODUCTS CONTAINING PARTIALLY VITREOUS AND PARTIALLY NONVITREOUS MATERIALS

Leroy G. Black, Trona, Calif., assignor to American Potash & Chemical Corporation, Trona, Calif., a corporation of Delaware Application January 30, 1939, Serial No. 253,524

3 Claims. (Cl. 83—94)

This invention relates to a process of separating fused products, which consist partially of vitreous and partially of non-vitreous material by grinding and classification.

Certain fused products consist of intimate mixtures of vitreous material and non-vitreous material. It is frequently desirable to separate these two constituents. Thus, for example, in the dehydration of hydrated borates, a fused mass is produced which upon cooling may consist partially of vitreous borax, known as borax glass, and partially of granular or crystalline anhydrous sodium tetraborate, $Na_2B_4O_7$. The granular or crystalline material firmly adheres to the vitreous or glass portion. Heretofore, no effort has been made to seperate the two forms and the mixed product has been ground completely to produce anhydrous sodium tetraborate for the market. There are, however, separate markets for both types of products, and superior products can be produced by separating these constituents.

It is therefore, the general object of the present invention to provide a method by which fused products can be readily and economically separated into their vitreous and non-vitreous constituents.

I have discovered that fused products, such as the fused mixture of vitreous borax glass with the granular crystalline anhydrous sodium tetraborate, may be readily and economically separated one from the other by a process of selectively grinding the material. I have found that by proper selective grinding it is possible to comminute granular or crystalline material to a finer size than the vitreous or glass constituent, whereby the two constituents may be readily separated one from the other. For example, the process of the present invention may be applied to the product of United States Patents Nos. 1,964,902 and 2,064,337. The product produced as described in such patents consists primarily of anhydrous sodium tetraborate in the form of crystals, and such a product is found to possess many advantages in industries requiring a raw material having a boron content. There remains, however, a limited but definite demand for anhydrous borax in the vitreous state, or borax glass. Although the product of the above patents consists principally of crystals of anhydrous borax, it may contain a limited quantity of borax in the vitreous form, the quantity varying with the method of producing and cooling the fused material.

In one method of carrying out the process of producing such material, the material is run into open molds and allowed to crystallize. Crystallization is enhanced by slow cooling. The more rapid the cooling, the more of the vitreous material produced. In any case, a thin layer of material next to the walls of the mold and also a thin skin on the upper surface of the mass in the mold usually will be cooled too quickly to allow for crystallization, and will, therefore, be in the form of borax glass. Increased quantities of glass may be produced in the process when the fused material is heated to temperatures appreciably above the fusion point; that is, when the fused material becomes strongly superheated, as when it remains within the fusion furnace for some time. The proportion of glass may be varied in this way to as much as 25%. With such products, as also with similar fusion products of other substances, the exterior vitreous matter is very intimately associated with the granular or crystalline portions. It is one of the objects of the present invention to provide a simple process by which such products may be treated, so that the vitreous and non-vitreous portions thereof are readily separable and preferably both attained as marketable products.

I have discovered that such mixtures of vitreous and crystalline fractions may be effectively separated into their component parts by a selective or differential grinding process which comminutes the crystalline fraction to a greater extent than the vitreous fraction, followed by a step to separate the two fractions according to size. The grinding may be controlled so that the crystalline matter is fractured and broken down into small grains while the vitreous matter is caused to remain mostly as larger particles, which can be segregated from the finer particles of crystalline matter. The crystalline fraction has been found to be sufficiently friable that individual grains or crystal fragments may be separated from the vitreous matter by a grinding process. In fact, if desired, the crystalline matter may be reduced essentially to a powder without destroying the larger vitreous particles. By the present invention, it has been found possible to produce a product which is composed almost entirely of the vitreous particles, being free of appreciable quantities of crystalline matter. Furthermore, the net recovery of vitreous particles can be made as high as 85-90%; and the process may be so carried out that two products of different sizes are attained.

The process of the present invention is based primarily upon the use of abrasion or attrition grinding as opposed to ordinary continuous pressure or blow or impact types of pulverizers. Preferably, the material to be processed is first reduced to approximately the size of a hen-egg and then subjected to a polishing type of grinding of such intensity and nature as to break down the crystalline fragments into individual grains and to rub the crystalline particles from the vitreous fragments to which they adhere, and in that manner reduce the crystalline material to a size appreciably smaller than that of the greater part of the vitreous matter. Thereby I produce a ground mixture which contains crystalline and vitreous matter as particles of appreciably different size, and separation of the two forms is a simple matter of size segregation. Screening or air classification, for example, can be used to obtain the two materials as separate products.

The duration of the grinding and its intensity will vary with the percentage recovery required, the substance being treated, and, for maximum recoveries, will be changed during the course of the grinding. In general, however, I prefer to grind the crushed material in stages and to separate the comminuted crystalline material between each stage, the intensity of the attrition grinding being decreased and the duration of treatment increased in successive stages. Stage grinding is preferred to permit the grinding characteristics to be varied in accordance with changes in the reaction of the material to grinding, as the crystalline fraction becomes pulverized and reduced in quantity.

Preferably, the first stage of attrition grinding is carried out to reduce the material to a maximum size of about ¼" to ½" in diameter. The glass particles will be fairly free of adhering crystalline material and a large part of said crystalline material will have been reduced to a size readily separable from the glass by screening. This result is attained by using choke feeding provided by using a circulating load with an attrition type disintegrator, whereby there is maintained a large amount of granular material in the mill during the grinding action, which serves to cushion the action of the grinding medium on the vitreous particles. The duration of grinding in the first stage is preferably made relatively short, and a combination of grinding intensity and duration of treatment is selected so that all of the raw material is reduced at least to about ¼" to ½" size fairly quickly. A large part of the crystalline matter becomes pulverized during the time needed to reduce all of the material to a size of about ¼" to ½", and also the greater part of the crystalline matter embedded in vitreous surfaces is unlocked and broken away.

The product from the first stage of abrasion grinding is passed over a screening device for the separation of the fines and coarser particles. This separation may be made at various screen sizes, and I have found that a cut made at about 14 to 16 mesh will segregate the large glass particles as oversize. Also, contained in the latter will be a small percentage of the original crystalline fraction. The undersize from the screening process will contain a high percentage of crystalline particles, and the size distribution thereof is suitable for a commercial product.

Following the screening operation, I subject the oversize particles to further abrasion grinding of less intensity and greater duration than that employed in the initial treatment. This final grinding must avoid, as before, subjecting the vitreous particles to sufficient abrasion to reduce them to a fine particle size, and in this case there are not sufficient crystalline particles available to cushion the grinding media and reduce their action on the particles of vitreous matter. I have found that only little additional grinding force is required to reduce essentially all of the crystalline particles to a size much smaller than the vitreous particles. Furthermore, during the reduction or grinding of the crystalline matter in this manner only a small percentage of the vitreous matter is reduced to a particle size comparable with that of the crystalline fraction. Therefore, in this final stage or stages of the attrition grinding, I employ very light grinding media and permit such light media to act on the crystalline matter for an extended period sufficient to reduce all of the latter to a relatively smaller size.

Following the final stage of grinding, the product is again subjected to a size separation operation. This may consist of a screening step or of some other method of classification, such as air classification, for example. The exact size at which the separation is to be made will vary with the particular type of grinding used. In the final grinding the vitreous matter will be considerably reduced in size although the particle size range will be much greater than that of the granular or crystalline fraction. I have found, for example, that excellent separation of granular material and good glass recovery are obtained when the separation after the final stage of grinding is made on a 20-mesh screen. The smallest separated vitreous grains are just plus 20-mesh size, while particles as large as ¼" may exist in the mixture. The crystalline fraction will be entirely minus 20-mesh, but the actual size pattern will vary over a considerable range below 20-mesh.

Many types of abrasion and attrition mills are capable of producing the desired selective comminution action, it being necessary only to select equipment which exerts a grinding action whose intensity will granulate or powder the crystalline particles but not the vitreous matter. Not only are the mills to which the term "attrition mills" is usually applied applicable, but also mills of the impact or direct blow type may often be modified to exert predominantly attritive and abrasive action on mixtures containing vitreous and crystalline fractions. Modified impact mills are preferred, especially in the first attrition grinding stage or stages following the coarser crushing, as the capacity of such equipment is great. The modification of these mills consists essentially in the use of lighter than normal grinding media and the operation of the unit under conditions of choke feeding or crushing. Choke feeding will cushion the action of the grinding media on the vitreous particles, and a smaller percentage of the latter is reduced to a fine size. The grinding media are chosen so that they will grind with an intensity insufficient to powder too much of the vitreous matter during such choke crushing.

As an example of my invention, I will describe its use for the separation of vitreous and crystalline anhydrous sodium tetraborate, the apparatus used being that set forth diagrammatically in Figure 1.

Referring now to the drawing, cooled masses of molten $Na_2B_4O_7$ cast in molds and produced in accordance with the patents previously cited, are first subjected to a preliminary coarse crushing to a size about that of hen-egg proportions. The differential grinding stages of the invention are applicable to best advantage when the raw material to be treated consists of small-sized lumps, though the sizing for this purpose may produce particles both somewhat larger and smaller than the preferred size. Any of a large variety of disintegrators are useful in this service, and I use a spiked roll crusher comprising two rolls rotating in opposite directions. This crushing is effected with free feeding of the mill to keep the quantity of fines to a minimum.

The preliminary crushed product is transferred from the roll crusher to a rod mill operated under choke feeding conditions and in conjunction with a scalping screen from which oversize product is partly re-circulated through the mill. A few relatively light-weight rods, which may be hollow if desired, are used in the mill, the size, weight, and number of rods being governed by the size of the mill, rate of feed, etc. The criteria determining the design of the mill is that the grinding action must be primarily of the abrasion or attrition type. Light-weight rods grind with less shock or impact, thus preserving the solid particles of glass. I employ the well-known method re-circulating the oversize particles. I prefer this method, as in that way crystalline material ground to the desired fine size is segregated quickly and is not subjected to excessive grinding, which would powder it. The rods used in the mill should be of a size only sufficient to break up the crystalline matter and not sufficient to powder the glass in the time available.

The exact particle size at which the separation is made on the screen is not critical but may be varied within a certain general range, as the vitreous particles will be mostly of a size appreciably larger than the bulk of the pulverized crystalline matter. I prefer to operate the process so that all of the granular material will pass a 14-mesh vibrating screen.

I have found that a large part of the crystalline matter will be unlocked from the vitreous matter, with which it is associated, in the rod mill. Some of the glass particles will retain adhering crystalline matter. Complete removal of the remaining crystalline matter is then accomplished by further crushing or pulverizing. This result is obtained by subjecting a part of the screen oversize to a further attrition grinding of longer duration and lower intensity than in the choke-fed rod mill. I do this in a ball mill carrying a light load of small balls. Here again, I desire to have the glass particles broken up as little as possible, the size and number of the balls used being chosen to that end. During such attrition grinding by the glass particles, only a minor portion of the glass is pulverized, though the glass particles may be ground to a size smaller than that produced in the rod mill. Also, crystalline matter adhering to glass particles will be rubbed or polished off in the ball mill, leaving a product containing most of the original glass in the form of particles of appreciable size while the crystalline matter is all present in a much smaller size. I have produced a fine product containing most of the glass in the form of particles greater than about 20-mesh in size and the crystalline matter as particles of size less than 20-mesh.

The recovery of crystal-free glass depends upon the number of stages of grinding used as the type, intensity, and duration of the grinding should be varied with the ratio of glass to crystalline matter and with the size of the particles. For a practical arrangement which gives good recovery combined with good capacity, I have found the arrangement shown and described to be satisfactory.

While I prefer to carry out my grinding process in stages, after the preliminary coarse crushing, as in that way a larger capacity is obtained, the entire process may be performed in a single mill, such as the first rod mill described. Such a mill must then be designed to have a grinding action which will remove even the intimately associated crystalline matter without destruction of the glass particles. The greater part of the friable matter may be comminuted to a size which is easily separated from the vitreous particles by a grinding force which in the absence of the large amount of unground friable matter would damage the vitreous particles, and in a multi-stage grinding process such a force can be used in the initial fine grinding. In a single stage, of course, only one degree of grinding can be used and this must not be sufficient to destroy excessive quantities of glass.

My invention is applicable to a considerable range and variety of conditions, and I will set forth the following example of one application thereof to the grinding of ingots of crystalline anhydrous $Na_2B_4O_7$ containing borax glass. For the initial stage of selective grinding a rod mill 3 feet by 8 feet carrying 10 to 22 rods 8 feet long and 3 inches in diameter, and rotating at about 30 R. P. M., was used. The range given for the number of rods permits variations in the milling rate and is necessary also as the rods required for a given rate vary with the composition of the crude mixed product. With this mill a milling rate of 2.5 to 6 tons per hour was possible, the rate depending upon the rod charge, while the circulating load was held uniform at about 20 tons per hour. The mill discharge was continuously passed over a Tyler Hummer 4 feet by 8 feet scalping screen having openings corresponding approximately to 14-mesh U. S. Standard. In preparing only a limited quantity of the glass, free of crystalline particles, less than the total quantity available, I continuously bled off about 0.25 ton per hour of a mixed product containing about 90% of glass. This bleed-off was transferred directly to a tube mill 16 inches in diameter and 12 feet long, carrying a 500 pound charge of ½ inch to 2½ inch steel balls. A 14-mesh scalping screen received the mill discharge. The oversize material from this latter screen consisted of a product containing about 98% of glass and 2% or less of remaining crystalline matter, the recovery of glass being substantially 84%.

While the particular process herein described is well adapted to carry out the objects of the present invention, it is to be understood that various modifications and changes may be made, and the invention includes all such modifications and changes as come within the scope of the appended claims.

I claim:

1. The process of separating the vitreous and granular forms of sodium tetraborate from intimately associated admixtures of said forms which comprises introducing relatively coarse particles of the mixed material into a choke fed rod mill operated to have a differential grinding action affecting the granular portion to a greater extent than the vitreous portion, continuously separating the comminuted particles from the oversized material and treating at least a part of the latter in a choke fed ball mill operated to reduce the greater part of the remaining granular material to a finer size while preserving the greater part of the vitreous material as particles of larger size.

2. The process of separating the vitreous and granular forms of sodium tetraborate from intimately associated admixtures of said forms which comprises introducing the admixture into a rod mill, subjecting the same therein under choke feeding conditions to a predominantly abrasion or attrition grinding of intensity sufficient to pulverize a large part of the granular material while retaining a substantial part of the vitreous material in the form of particles of larger size, separating and recovering the pulverized material, grinding at least a part of the remaining larger particles by an abrasion or attrition process of less intensity but of sufficient duration to pulverize the remaining granular material while leaving the greater part of the vitreous material as particles of larger size, and separating the pulverized material from the larger vitreous particles.

3. The process of separating the vitreous and granular forms of sodium tetraborate from intimately associated admixtures of said forms, which comprises introducing relatively coarse particles of said admixture into a choke fed rod mill operated to have a differential grinding action affecting the granular portion to a greater extent than the vitreous fraction, continuing the grinding until the crystalline material is essentially pulverized while preserving the vitreous material as particles of larger size, separating the crystalline particles from the larger glass particles and recovering both products.

LEROY G. BLACK.